(12) United States Patent
Grable et al.

(10) Patent No.: US 7,784,483 B2
(45) Date of Patent: Aug. 31, 2010

(54) BACKFLOW PREVENTER

(75) Inventors: Jonathan L. Grable, San Miguel, CA (US); William M. Orr, Paso Robles, CA (US)

(73) Assignee: Zurn Industries, LLC, Erie, PA (US)

( * ) Notice: Subject to any disclaimer, the term of this patent is extended or adjusted under 35 U.S.C. 154(b) by 854 days.

(21) Appl. No.: 11/334,955

(22) Filed: Jan. 19, 2006

(65) Prior Publication Data

US 2006/0185731 A1  Aug. 24, 2006

Related U.S. Application Data

(60) Provisional application No. 60/646,079, filed on Jan. 21, 2005.

(51) Int. Cl.
F16K 43/00 (2006.01)
F16K 15/02 (2006.01)

(52) U.S. Cl. .............. 137/115.13; 137/315.33; 137/512

(58) Field of Classification Search ............. 137/15.18, 137/115.13, 315.33, 511, 512, 215, 218, 137/15.33; 285/302
See application file for complete search history.

(56) References Cited

U.S. PATENT DOCUMENTS

| 730,463 | A | 6/1903 | Keyt |
|---|---|---|---|
| 1,194,358 | A | 8/1916 | Cecil et al. |
| 1,399,791 | A | 12/1921 | Pierson |
| 1,871,536 | A | 8/1932 | Le Bus |
| 1,969,432 | A | 8/1934 | Smith et al. |
| 2,472,933 | A | 6/1949 | Anderson |
| 2,515,425 | A | 7/1950 | Restemeier |
| 2,556,277 | A | 6/1951 | Hill et al. |
| 2,626,124 | A | 1/1953 | McCarthy |
| 2,630,294 | A | 3/1953 | Ericson et al. |
| 2,748,788 | A | 6/1956 | Duckstein |
| 2,770,314 | A | 11/1956 | Powell |
| 2,842,150 | A | 7/1958 | Olson |
| 2,845,085 | A | 7/1958 | Robbins |
| 3,026,902 | A | 3/1962 | Ruhl, Jr. |
| 3,060,961 | A | 10/1962 | Conley |
| 3,245,257 | A | 4/1966 | Anderson |
| 3,259,144 | A | 7/1966 | Taplin |
| 3,276,465 | A * | 10/1966 | Wyckoff ............... 137/107 |
| 3,283,772 | A | 11/1966 | Ensign |
| 3,294,115 | A | 12/1966 | Koenigsberg et al. |
| 3,313,458 | A | 4/1967 | Braun |

(Continued)

FOREIGN PATENT DOCUMENTS

GB   1194358   6/1970

(Continued)

Primary Examiner—John Rivell
Assistant Examiner—William McCalister
(74) Attorney, Agent, or Firm—The Webb Law Firm

(57) ABSTRACT

A backflow preventer that generally includes a modular fluid arrangement having a modular strut, a one-piece modular cage, a relief valve fluidly connected to the modular cage, and at least one in-line check valve removably housed in the modular cage. In operation, when backflow occurs, pressure in a chamber of the relief valve increases to provide a passageway for fluid to flow out of the modular cage, through the relief valve, to the environment. When the backflow stops, the pressure in the chamber decreases and the passageway closes, moving the fluid through the interior of the modular cage.

15 Claims, 15 Drawing Sheets

U.S. PATENT DOCUMENTS

| | | |
|---|---|---|
| 3,422,841 A | 1/1969 | Farrer |
| 3,478,778 A | 11/1969 | Curtiss et al. |
| 3,482,603 A | 12/1969 | Outcalt |
| 3,604,453 A | 9/1971 | Boitnott |
| 3,636,968 A | 1/1972 | Tine |
| 3,789,874 A | 2/1974 | Hills |
| 3,817,273 A | 6/1974 | Erwin, Jr. |
| 3,817,278 A | 6/1974 | Elliott |
| 3,818,929 A * | 6/1974 | Braukmann .................. 137/218 |
| 3,857,408 A | 12/1974 | Rhodes et al. |
| 3,870,071 A | 3/1975 | Graham et al. |
| 3,905,382 A | 9/1975 | Waterston |
| 3,946,754 A | 3/1976 | Cook |
| 3,974,848 A | 8/1976 | Wheatley |
| 3,974,854 A | 8/1976 | Kurpanek |
| 3,996,962 A | 12/1976 | Sutherland |
| 4,019,532 A | 4/1977 | Schittek |
| 4,067,356 A | 1/1978 | Kreuz |
| 4,117,856 A | 10/1978 | Carlson |
| 4,141,381 A | 2/1979 | Eminger |
| 4,159,025 A | 6/1979 | Harthun |
| 4,188,973 A | 2/1980 | Weise et al. |
| 4,232,704 A | 11/1980 | Becker et al. |
| 4,249,563 A | 2/1981 | Shaw |
| 4,259,983 A | 4/1981 | Kessel |
| 4,270,559 A | 6/1981 | Wallberg |
| 4,284,097 A | 8/1981 | Becker et al. |
| 4,313,462 A | 2/1982 | Adamson |
| 4,327,760 A | 5/1982 | Lancaster |
| 4,332,271 A | 6/1982 | Rohr |
| 4,460,012 A | 7/1984 | Koumi et al. |
| 4,552,174 A | 11/1985 | Carl et al. |
| 4,562,860 A | 1/1986 | Walter et al. |
| 4,566,489 A | 1/1986 | Knapp et al. |
| 4,569,636 A | 2/1986 | Bauer et al. |
| 4,576,234 A | 3/1986 | Upchurch |
| 4,582,081 A | 4/1986 | Fillman |
| 4,587,990 A | 5/1986 | Pennell et al. |
| 4,669,500 A | 6/1987 | Strelow |
| 4,700,732 A | 10/1987 | Francisco |
| 4,706,706 A | 11/1987 | Page et al. |
| 4,874,012 A | 10/1989 | Velie |
| 4,893,654 A | 1/1990 | Feuz |
| 4,917,141 A | 4/1990 | Brunel et al. |
| 4,989,635 A | 2/1991 | Dunmire |
| 5,046,525 A | 9/1991 | Powell |
| 5,072,753 A | 12/1991 | Ackroyd |
| 5,125,429 A | 6/1992 | Ackroyd et al. |
| 5,135,019 A | 8/1992 | Dupont |
| 5,146,949 A | 9/1992 | Retzloff et al. |
| 5,148,828 A | 9/1992 | Farnham |
| 5,152,502 A | 10/1992 | Randall et al. |
| 5,156,183 A | 10/1992 | Scaramucci |
| 5,203,365 A | 4/1993 | Velie |
| 5,207,242 A | 5/1993 | Daghe et al. |
| 5,236,009 A | 8/1993 | Ackroyd |
| 5,327,933 A | 7/1994 | Ishikawa et al. |
| 5,360,032 A | 11/1994 | Schenk |
| 5,392,803 A | 2/1995 | Bruce |
| 5,439,028 A | 8/1995 | Meyer et al. |
| 5,503,176 A | 4/1996 | Dunmire et al. |
| 5,511,574 A | 4/1996 | Macke |
| 5,524,663 A | 6/1996 | Walsh et al. |
| 5,546,977 A | 8/1996 | Chaney |
| 5,584,315 A | 12/1996 | Powell |
| 5,669,405 A | 9/1997 | Engelmann |
| 5,711,341 A | 1/1998 | Funderburk et al. |
| 5,732,744 A | 3/1998 | Barr et al. |
| 5,785,077 A | 7/1998 | Rice |
| 5,794,655 A | 8/1998 | Funderburk et al. |
| 5,799,928 A | 9/1998 | Siver |
| 5,947,152 A | 9/1999 | Martin et al. |
| 6,039,069 A | 3/2000 | Gonsior |
| 6,050,293 A | 4/2000 | Lin et al. |
| 6,220,282 B1 | 4/2001 | Powell |
| 6,302,132 B1 | 10/2001 | Lay |
| 6,325,090 B1 | 12/2001 | Horne et al. |
| 6,374,849 B1 | 4/2002 | Howell |
| 6,513,543 B1 * | 2/2003 | Noll et al. ............... 137/315.11 |
| 6,581,626 B2 * | 6/2003 | Noll et al. ............... 137/315.11 |
| 6,659,511 B2 * | 12/2003 | Yoneyama et al. .......... 285/360 |
| 2004/0134537 A1 * | 7/2004 | Noll et al. ................... 137/512 |

FOREIGN PATENT DOCUMENTS

| | | |
|---|---|---|
| JP | 64-21287 | 7/1987 |
| JP | 63-30667 | 2/1988 |

* cited by examiner

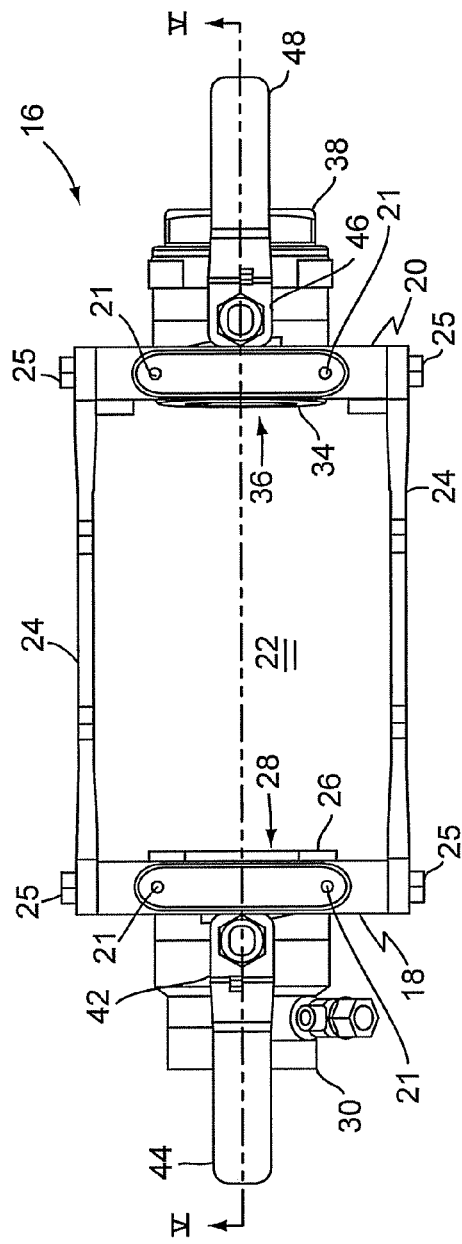
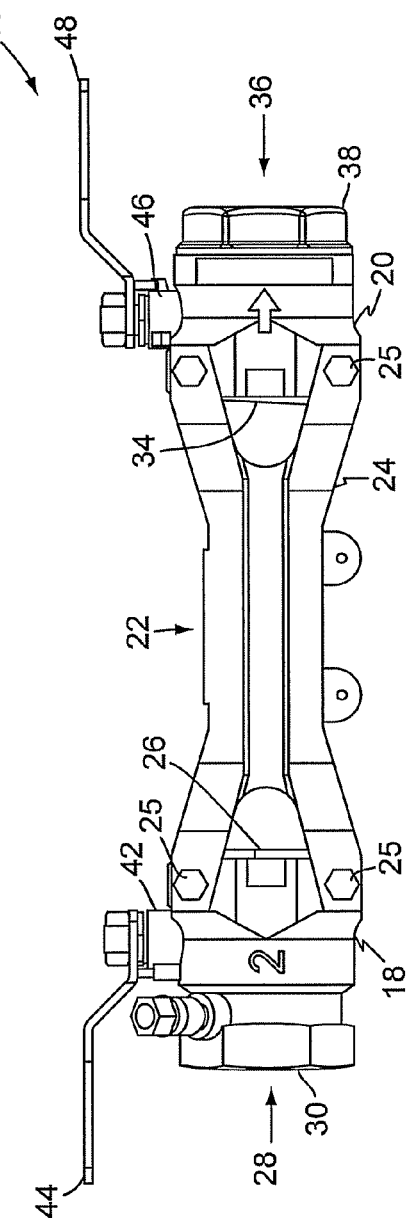
FIG. 3
FIG. 4

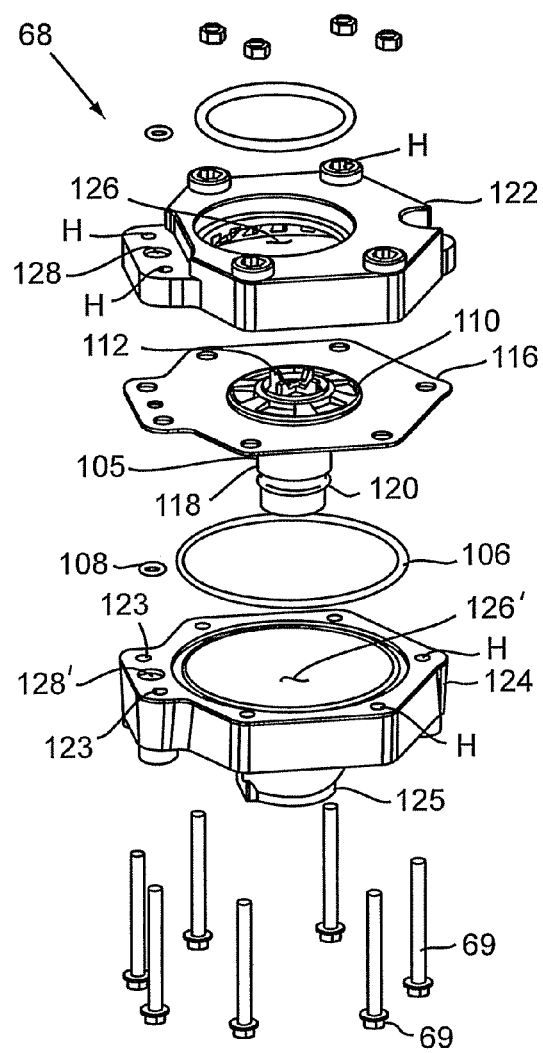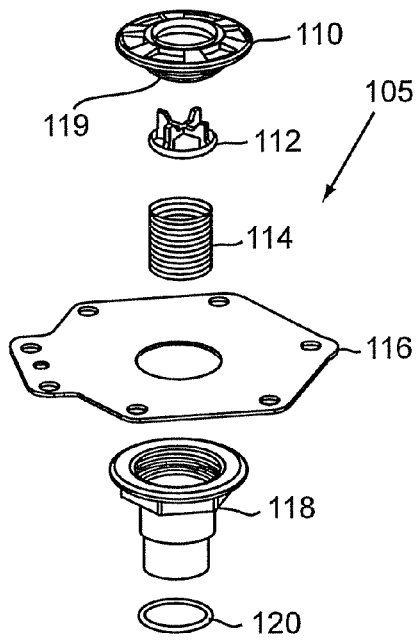
FIG. 14
FIG. 15

BACKFLOW PREVENTER

CROSS REFERENCE TO RELATED APPLICATION

This application claims the benefit of U.S. Provisional Application Ser. No. 60/646,079, filed Jan. 21, 2005.

BACKGROUND OF THE INVENTION

1. Field of the Invention

The present invention relates to a backflow preventer and, more particularly, to a modular fluid arrangement for a check valve to prevent backflow through the check valve.

2. Description of Related Art

Fluid valves generally include a main body having two ends. The main body also forms an internal flow cavity that fluidly connects the two ends and houses internal valves. In a typical installation, one end of the main body is connected to a fluid inlet pipe and the other end is connected to a fluid outlet pipe. Fluid flows from the fluid inlet pipe, through the internal flow cavity, is stopped, directed, or left unimpeded by the internal valves, and exits through the fluid outlet pipe. Such fluid valves can include backflow prevention valves, which ensure that fluid flow always flows in one direction. When, for various reasons, fluid does try to flow backward, the safest and most effective device for stopping the backflow is a "reduced pressure principle" backflow valve.

Some fluid backflow valves have movable parts, such as two independently acting check valves positioned in the internal flow cavity formed by a main body and, as a failsafe, a differential pressure relief valve (RV) attached to a port of the main body. The RV acts as a failsafe because, in a backflow condition, even if the check valves fail, the RV will ensure that no downstream fluid is permitted to flow into an upstream fluid supply line by dumping potential backflow fluid to the atmosphere. Generally, most RV's are controlled internally by a pressure differential acting across a diaphragm. Typically, high pressure acting on one side (i.e., high side) of a diaphragm will force a rubber seal ring to abut against a "seat" edge, thus creating a water-tight seal. When the force due to pressure acting on an opposite side (i.e., low side) of the diaphragm acting in conjunction with a spring exceeds the high side force, the seal and seat edge will separate and open up a flow path for the fluid to escape. In essence, the diaphragm acts as a switch that opens and closes the flow path of the RV. Because the RV operation depends heavily on the diaphragm, which is typically made of an elastomeric material, a larger size diaphragm is generally used to provide for a stronger, more robust and positive RV operation. However, the advantages of a larger diaphragm have to be weighed against the disadvantages associated with a larger size diaphragm, often resulting in an overall bulkier valve design.

The repair, inspection, or replacement of the fluid valves (i.e., check valves and RV) within the backflow prevention valve typically requires the flow of fluid to be shut off. An inlet shutoff valve, or some other member, as shown in U.S. Pat. Nos. 1,969,432; 3,245,257; 3,946,754; 4,327,760; 5,392,803; 5,511,574; and 5,732,744, is typically positioned adjacent one end of the main body and an outlet shutoff valve is positioned adjacent the other end of the main body. In turn, each shutoff valve is connected, respectively, to the fluid inlet pipe or the fluid outlet pipe. The shutoff valves are required for testing and service of the backflow prevention valve. Access to internal components of such fluid valves is typically accomplished through one or more access ports or openings. Under certain regulatory codes, the main body, which houses the fluid valves, cannot be completely removed from the fluid handling system during routine maintenance and inspection of the valves. In other instances when the main body is in a location that is not easily accessible to maintenance personnel, maintenance and inspection of such valves can become difficult.

In some fluid handling installations, a bypass line is often used to maintain fluid flow through the system, while selected ones of the fluid valves of the system are either being repaired, inspected, or replaced. This bypass line adds additional costs and takes up extra space in the fluid handling installation. In some installations, a minor disruption in the fluid flow may not result in serious adverse consequences downline of the fluid handling installation and a bypass line is not required. Therefore, if the time of repair, replacement, or inspection of a fluid valve can be minimized, an additional bypass line may not be required.

Therefore, it is an object of the present invention to overcome the above-mentioned deficiencies by providing a modular fluid arrangement for a check valve that provides for easy maintenance and replacement of check valves, with minimal disruption of the flow in a fluid handling installation. It is also desirable to provide a compact and space-efficient modular fluid arrangement, while providing a strong, robust, and positive RV operation.

SUMMARY OF THE INVENTION

The present invention provides for a modular fluid arrangement for a check valve, e.g., a check valve assembly, that includes, among other things, a modular strut and a modular cage. The modular strut includes an inlet body and an outlet body and defines a modular cage receiving area therebetween. The modular cage having a first open end and a second open end and defining an interior cavity therebetween is adapted to be received by the modular cage receiving area of the modular strut. The interior cavity of the modular cage, which is adapted to be in fluid communication with the inlet body and the outlet body of the modular strut, is also adapted to receive at least one check valve. A differential pressure relief valve can be fluidly connected to the modular cage, wherein the pressure relief valve is adapted to be in fluid communication with the inlet body and the outlet body of the modular strut. The pressure relief valve has a biased seat, a rubber seal that remains stationary during operation, a diaphragm, a spring, and a piston that allows fluid to flow centrally out of the modular cage when pressure breaks the seal between the seat and the rubber seal. The fluid flows through the seat, diaphragm, spring, and piston.

The present invention also provides for a check valve assembly that includes the modular fluid arrangement having the modular cage and the modular strut previously discussed, wherein the modular cage is removably secured to the modular strut. A plurality of check valves removably sealed within the interior cavity of the modular cage are in fluid communication with the inlet body and the outlet body of the modular strut.

The modular fluid arrangement of the invention compensates for the expansion and contraction of the assembly under the effects of thermal expansion and contraction, water hammer, pressure fluctuations, and part length fluctuations for the protection of the valve components and for the preservation of gasket integrity.

The present invention also provides for a method of installing check valves in line with respect to a fluid conduit using a modular fluid arrangement as previously discussed. The method includes, among other things, inserting at least one check valve into the interior cavity of the modular cage; inserting the modular cage into the modular cage receiving area; removably securing the modular cage to the modular strut; and installing the modular fluid arrangement in line with respect to a fluid conduit.

BRIEF DESCRIPTION OF THE DRAWINGS

FIG. 3 is a top elevational view of the modular strut shown in 2;

FIG. 4 is a side elevational view of the modular strut shown in FIG. 3;

FIG. 14 is an exploded view of the pressure relief valve shown in FIG. 13;

FIG. 15 is an exploded view of a relief valve cartridge of the pressure relief valve shown in FIG. 14;

DETAILED DESCRIPTION OF THE INVENTION

Figure 1:
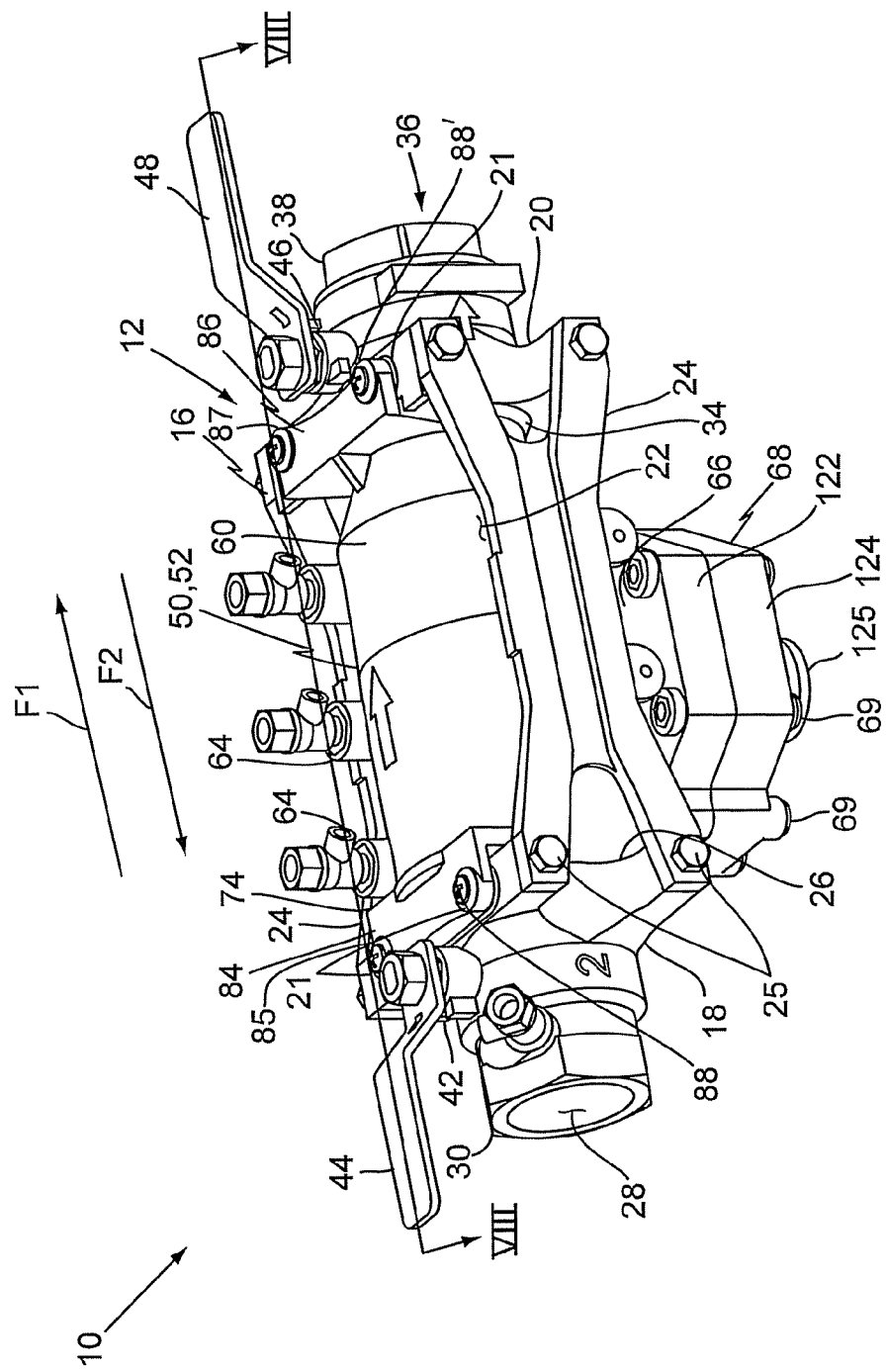
FIG. 1 is a top, side orthogonal view of a check valve assembly incorporating features of, and made in accordance with, the present invention.

As used herein, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 6.7, or 3.2 to 8.1, or 5.5 to 10.

Before discussing non-limiting embodiments of the invention, it is understood that the invention is not limited in its application to the details of the particular non-limiting embodiments shown and discussed herein since the invention is capable of other embodiments. Further, the terminology used herein to discuss the invention is for the purpose of description and is not of limitation. Still further, unless indicated otherwise in the following discussion, like numbers refer to like elements.

Figure 2:
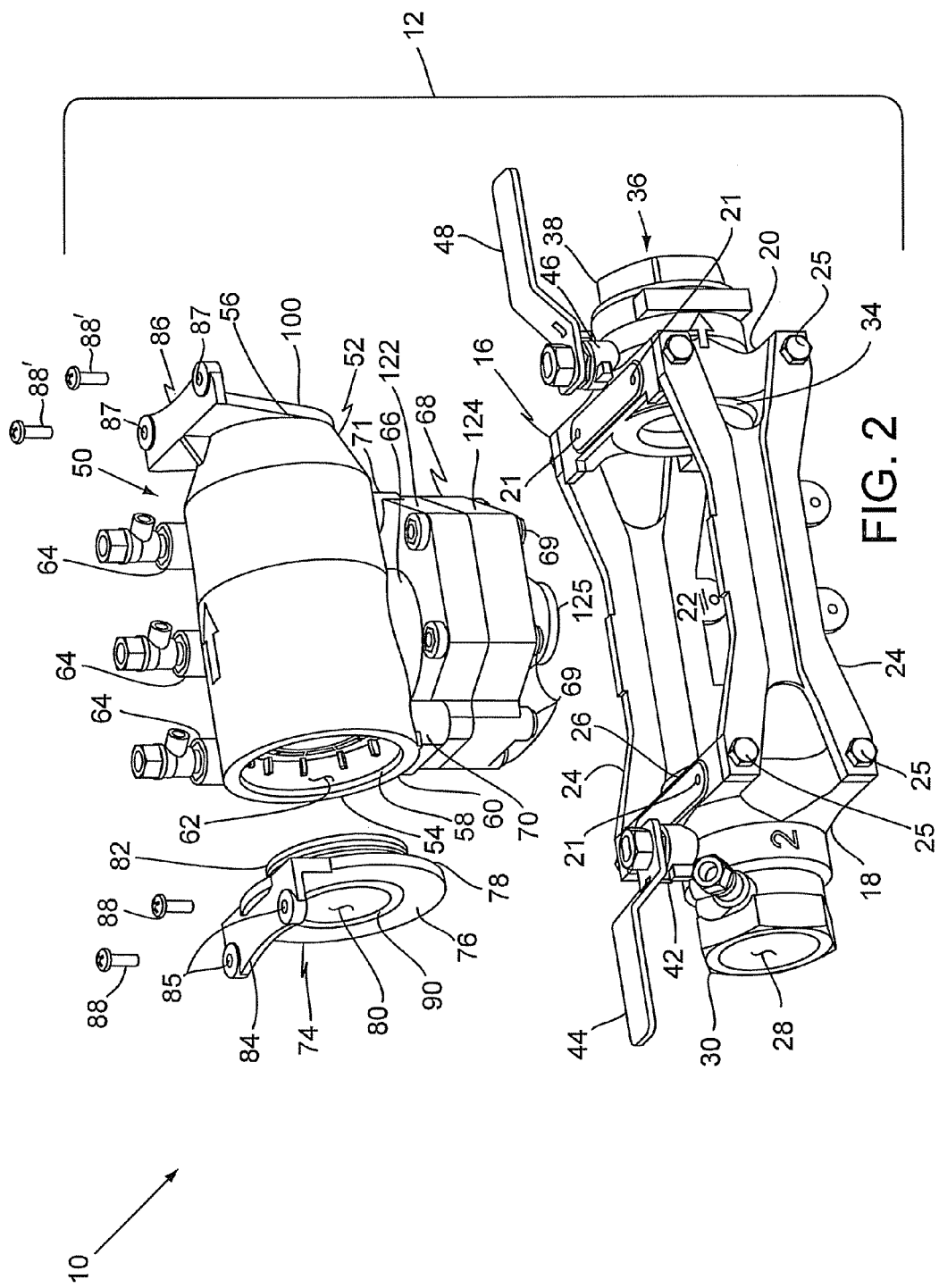
FIG. 2 is an exploded top, side orthogonal view of the check valve assembly shown in FIG. 1.
Figure 5:
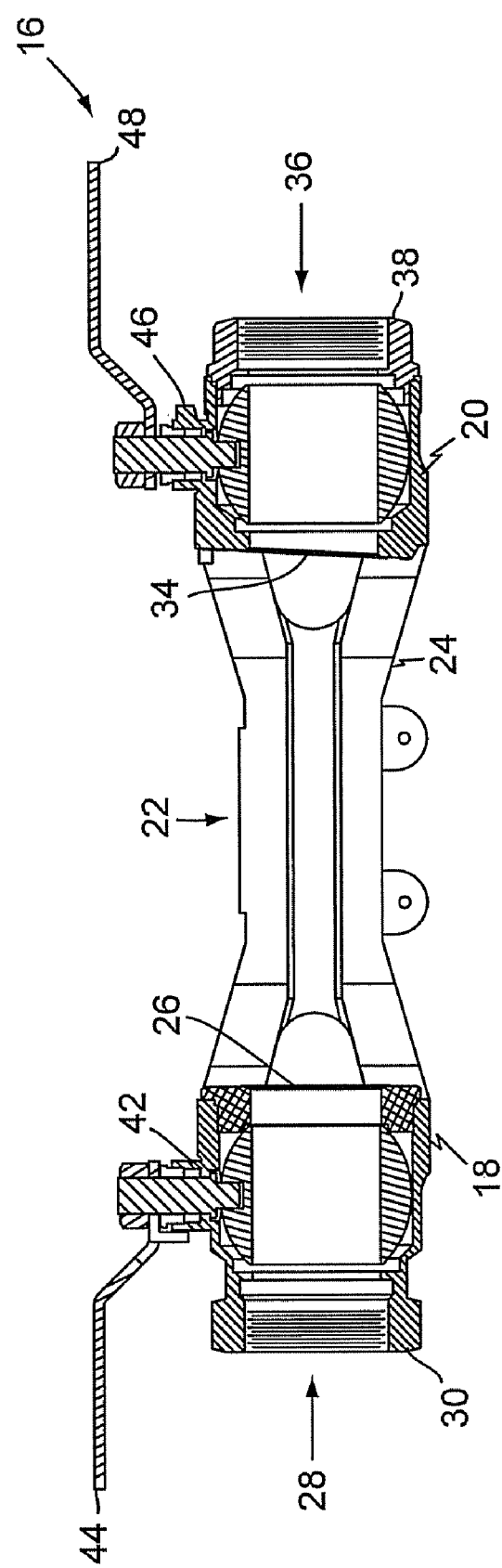
FIG. 5 is a view taken along lines V-V of FIG. 3.

FIG. 1 shows a check valve assembly 10 made in accordance with the present invention. The assembly 10 includes a modular fluid arrangement 12 having one or more in-line check valves (and, preferably, two check valves 14 and 14' having outer surfaces 15 as shown in FIGS. 8-12) received within the modular fluid arrangement 12. Referring to FIGS. 1 and 2, the modular fluid arrangement 12 includes a modular strut 16 having an inlet body 18 and an outlet body 20 and defining a modular cage receiving area 22 therebetween, and a one-piece modular cage 50 removably secured to the modular strut 16 and received by the modular cage receiving area 22. The modular strut 16 includes a pair of spacers 24 (shown in FIG. 2) separating the inlet body 18 from the outlet body 20.

Referring to FIGS. 2-5, the inlet body 18 of the modular strut 16 forms an inlet receiving surface 26, a fluid inlet channel 28, and a first connector 30, and the outlet body 20 forms an outlet receiving surface 34, a fluid outlet channel 36, and a second connector 38. The first connector 30 and second connector 38 are adapted to connect to a fluid conduit (not shown). The fluid inlet channel 28 extends from the inlet receiving surface 26 to the first connector 30 of the inlet body 18, and the fluid outlet channel 36 extends from the outlet receiving surface 34 to the second connector 38 of the outlet body 20 of the modular strut 16.

Referring to FIGS. 1-5, the pair of spacers 24 are each removably connected to the inlet body 18 and the outlet body 20 by fasteners 25, such as bolts. The spacers 24, which can vary in length depending on the length of the modular cage 50, can be sized to reduce the movement of the inlet body 18 and the outlet body 20 with respect to one another, e.g., toward one another. A first shutoff valve 42 having a first handle 44 is positioned between the first connector 30 and the inlet receiving surface 26 and is integrally formed with the inlet body 18 of the modular strut 16. A second shutoff valve 46 having a second handle 48 is positioned between the second connector 38 and the outlet receiving surface 34 and is integrally formed with the outlet body 20 of the modular strut 16. The modular strut 16 can be made of metal or a rigid polymeric material, such as, but not limited to plastic and/or glass and/or steel fiber-reinforced plastic.

Figure 6:
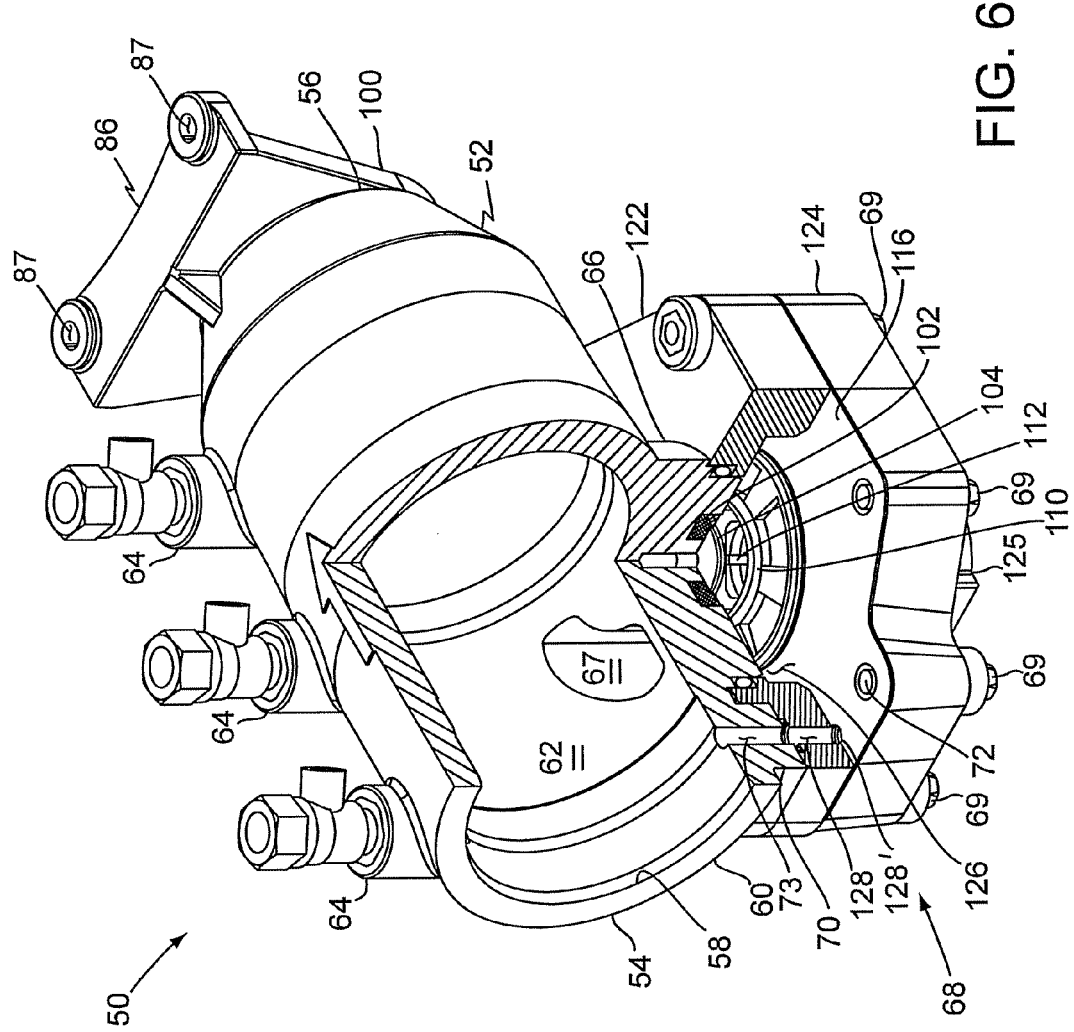
FIG. 6 is a top, side orthogonal view, partially in section, of the modular fluid arrangement of the check valve assembly shown in FIG. 2.
Figure 7:
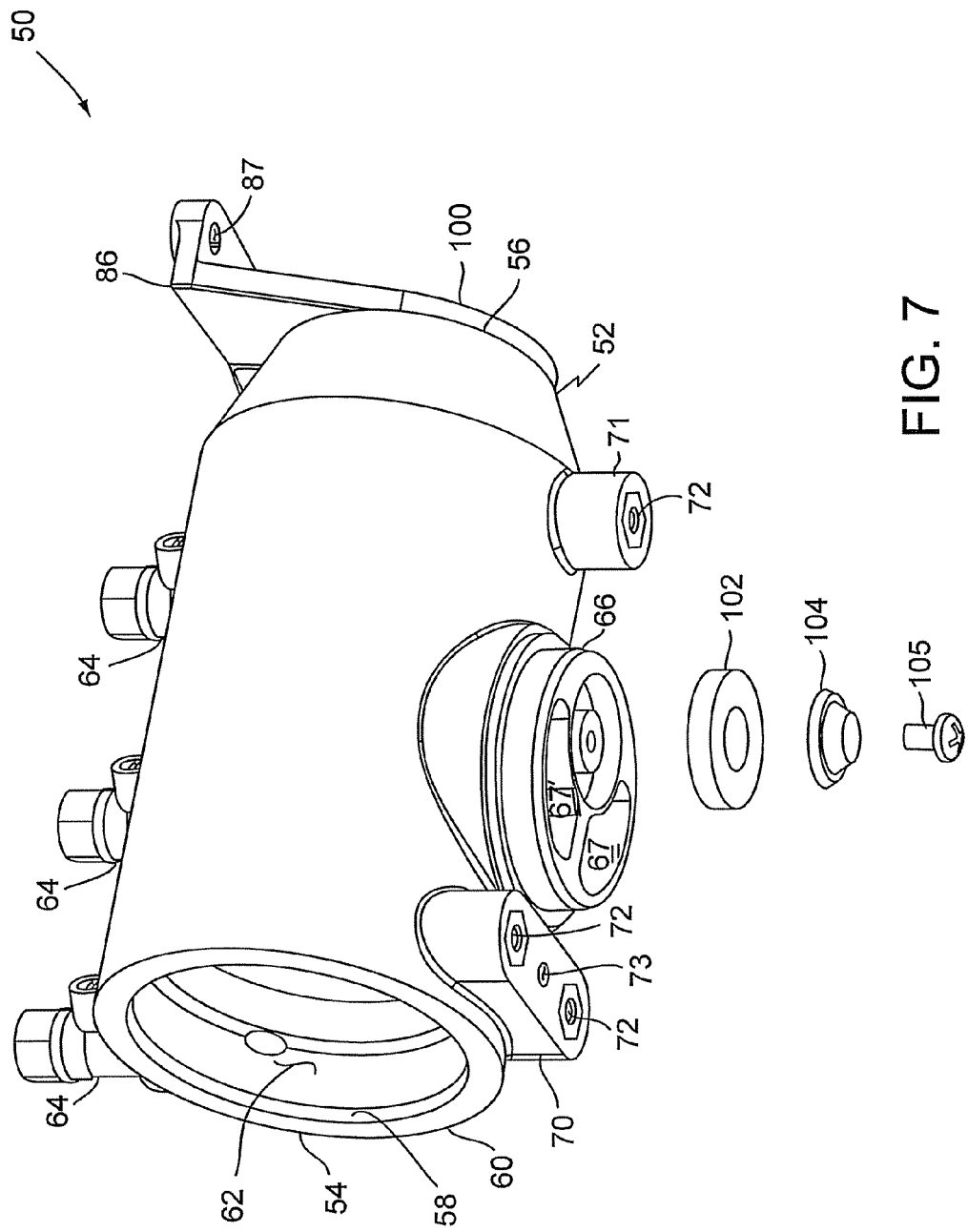
FIG. 7 is a bottom, side orthogonal view of the modular cage of the modular fluid arrangement shown in FIG. 6.
Figure 8:
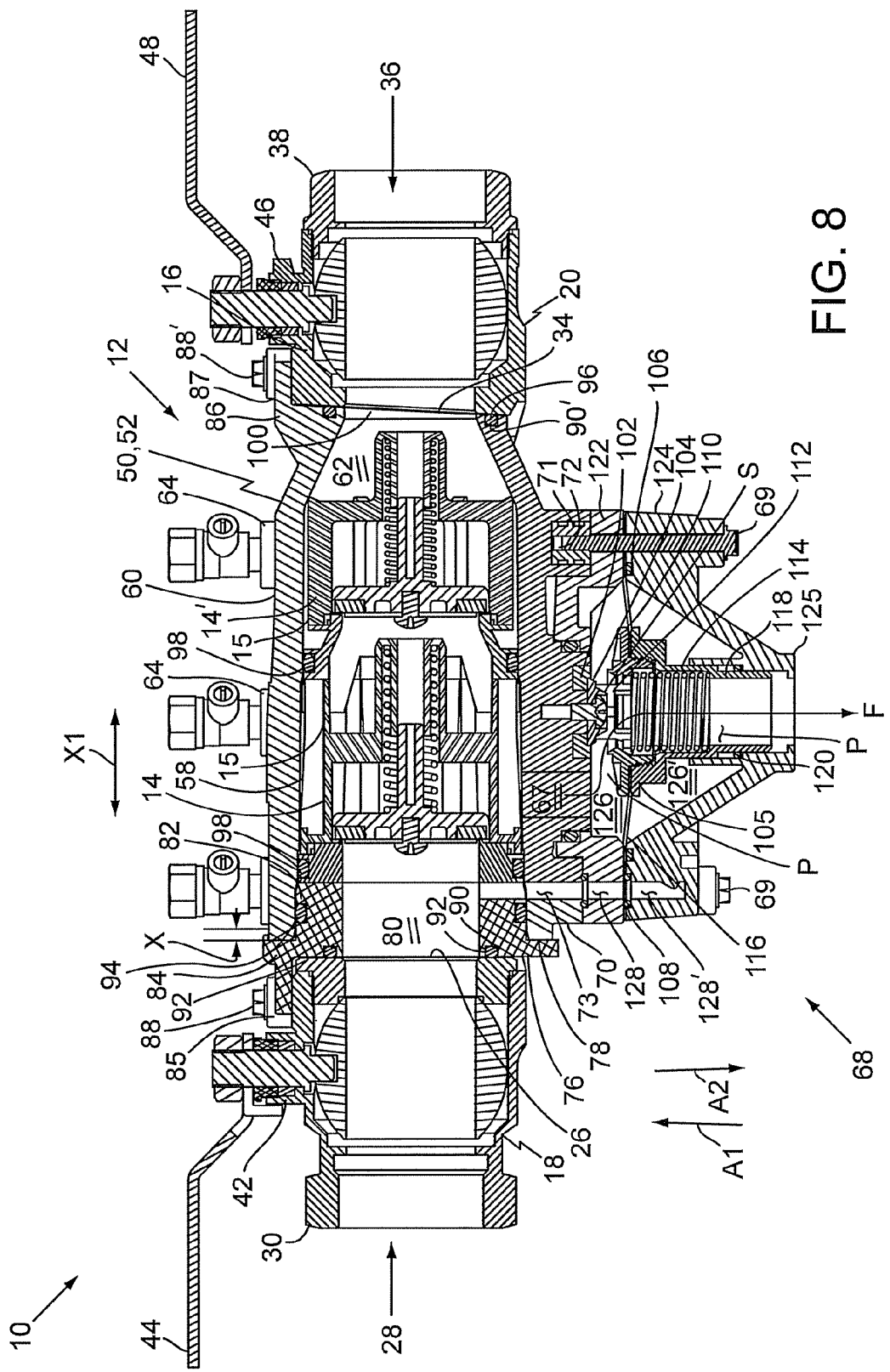
FIG. 8 is a view taken along lines VIII-VIII of FIG. 1.

Referring to FIGS. 2 and 6-12, and in particular to FIG. 6, the modular cage 50 includes a body 52 having a first open end 54, a second open end 56, an interior surface 58, and an exterior surface 60, wherein the interior surface 58 defines an interior cavity 62 between the first open end 54 and the second open end 56 of the body 52 of the modular cage 50. Referring to FIG. 8, the interior cavity 62 of the body 52 of the modular cage 50 is adapted to be in fluid communication with the fluid inlet channel 28 of the inlet body 18 and the fluid outlet channel 36 of the outlet body 20 of the modular strut 16. Referring to FIGS. 9-12, the interior cavity 62 of the body 52 of the modular cage 50 is also adapted to receive the in-line check valves 14, 14'. The in-line check valves 14, 14' are similar to those shown and described in U.S. Pat. No. 6,513,543 to Noll et al., which is herein incorporated by reference. The modular cage 50 can be geometric shaped, such as tubular shaped, rectangular shaped, hexagonal shaped, or other polygonal shape, and can be made of metal or a polymeric material, such as, but not limited to plastic and/or glass and/or steel fiber-reinforced plastic.

Referring back to FIG. 1, the modular cage 50 is removably secured within the modular cage receiving area 22 of the modular strut 16. As shown in FIGS. 2 and 3, a plurality of receiving slots 21 are defined in the inlet body 18 and the outlet body 20, wherein the receiving slots 21 are adapted to receive fasteners for securing the modular cage 50 to the modular strut 16 in a manner discussed below. Referring to FIGS. 2 and 6-8, at least one tap 64 (and, preferably, a plurality of taps 64) extends from the exterior surface 60 of the body 52, wherein the taps 64 are in fluid communication with the interior cavity 62 of the body 52 of the modular cage 50. The taps 64 can be internally threaded for attaching additional components, such as pressure gauges and flow gauges, to the check valve assembly 10.

Referring to FIGS. 6 and 7, a valve tap 66 having at least one opening 67 (preferably two openings 67, 67'), which can be positioned on the body 52 of the modular cage 50 opposite the tap(s) 64, extends from the exterior surface 60 of the body 52, wherein the openings 67, 67' are in fluid communication with the interior cavity 62 of the body 52 of the modular cage 50. The modular cage 50 also defines a first protrusion 70 and a second protrusion 71 opposed from each other and extending from the body 52 adjacent the valve tap 66, wherein the protrusions 70, 71 each define at least one slot 72 (preferably two slots 72 in the first protrusion 70 and one slot in the second protrusion 71) for receiving fasteners for attachment of a pressure relief valve 68 to the valve tap 66. The slots 72 can be internally threaded to receive threaded fasteners, such as bolts 69 (see FIGS. 9-11). Alternatively, the protrusions 70, 71 can have threaded inserts molded into the slots 72 of the body 52 of the modular cage 50.

Referring to FIGS. 6-8, and in particular to FIG. 8, an upstream pressure port 73 is provided in the first protrusion 70 and is in fluid communication with the interior cavity 62 of the body 52 of the modular cage 50. The differential pressure relief valve 68 can be removably attached to the valve tap 66, wherein the pressure relief valve 68 is in fluid communication with the interior cavity 62 of the body 52 of the modular cage 50 via the openings 67, 67' and the pressure port 73. The relief valve 68, which can be hydraulically operated, protects against fluid flow toward the fluid inlet channel 28, e.g., in direction F2 (shown in FIG. 1), by discharging fluid from the interior of the modular cage 50 through the relief valve 68 along flow path F1 to the outside atmosphere or environment as shown in FIG. 8. A detailed description of the pressure relief valve 68 is discussed later.

Referring to FIGS. 2 and 8-12, the modular cage 50 further includes a removable end piece 74 having a first side 76 and a second side 78 and defining a central opening 80, wherein the end piece 74 is adapted to engage the first open end 54 of the body 52 of the modular cage 50. An annular member 82 surrounding the central opening 80 and extending away from the second side 78 of the end piece 74 is adapted to be received within the interior cavity 62 of the body 52 of the modular cage 50. A first bracket 84 is attached to the periphery of the end piece 74 and extends away from the first side 76, wherein the first bracket 84 defines a plurality of slots 85 adapted to receive end piece fasteners 88 (see FIG. 2) for securing the modular cage 50 to the modular strut 16. A second bracket 86, which is similar to first bracket 84, is attached to the exterior surface 60 at the second open end 56 of the body 52 of the modular cage 50 and extends away from the second open end 56, wherein the second bracket 86 defines a plurality of slots 87 adapted to receive end piece fasteners 88' for securing the modular cage 50 to the modular strut 16. The end piece fasteners 88, 88' can be threaded fasteners, such as bolts, to capture the ends of the fasteners in the slots 21 of the modular strut 16.

Referring to FIGS. 2 and 8, an annular groove 90 defined on the first side 76 of the end piece 74 is adapted to receive a first sealing gasket 92 (shown in FIG. 8). The first sealing gasket 92 is adapted to provide a seal between the inlet receiving surface 26 of the inlet body 18 of the modular strut 16 and the first side 76 of the end piece 74. A second sealing gasket 94 may be positioned on the annular member 82 (shown in FIG. 8), wherein the second sealing gasket 94 is adapted to provide a seal between interior surface 58 of the interior cavity 62 of the body 52 of the modular cage 50 and the annular member 82 of the end piece 74. A second annular groove 90' defined on the exterior surface 60 of the second open end 56 of the body 52 of the modular cage 50 is adapted to receive a third sealing gasket 96 as shown in FIG. 8. The third sealing gasket 96 is adapted to provide a seal between the interior cavity 62 of the body 52 of the modular cage 50 and the outlet receiving surface 34 of the outlet body 20 of the modular strut 16. The gaskets 92, 94, and 96, which can be made of an elastomeric material, such as rubber, can be annular shaped, such as O-rings as shown for the sealing gasket 92 (shown in FIG. 8), or flat gaskets (not shown). Alternatively, any type of sealing arrangement can be used, such as an arrangement having one fluid seal or a plurality of fluid seals.

Referring to FIGS. 8-12, the plurality of check valves 14, 14' can be removably seated within the interior cavity 62 of the body 52 of the modular cage 50, wherein a valve gasket 98 can be positioned on the outer surfaces 15 of each check valve 14, 14'. When the check valves 14, 14' are received within the interior cavity 62 of the body 52 of the modular cage 50, the gasket 98 is compressed against the interior surface 58 of the interior cavity 62 and the outer surfaces 15 of the check valves 14, 14', thus sealing the check valves 14, 14' within the interior cavity 62 of the body 52 of the modular cage 50 (shown in FIG. 8). When the end piece 74 is placed adjacent the first open end 54 of the body 52 of the modular cage 50, the modular cage 50 can be received within the modular cage receiving area 22 of the modular strut 16. Referring to FIGS. 2 and 8, a wedge surface or angled surface 100 defining a central opening and defining the second open end 56 of the body 52 of the modular cage 50 abuts against the outlet receiving surface 34 of the outlet body 20 of the modular strut 16. The wedge surface 100 enables the modular cage 50 and the end piece 74 to be held in place by a tight fit between the first side 76 of the end piece 74 and the inlet receiving surface 26 and the outlet receiving surface 34 of the modular strut 16. As discussed and not limiting to the invention, the modular cage 50 can be secured to the modular strut 16 via fasteners 88, 88' passing through slots 85, 87 of brackets 84, 86, respectively, and receiving slots 21 of the inlet body 18 and the outlet body 20 of the modular strut 16. Although the check valves 14, 14' are sealed within the modular cage 50, the modular cage 50 can move or float a predetermined distance X (see FIG. 8) between the second side 78 of the end piece 74 and the first open end 54 of the body 52 of the modular cage 50. The modular cage 50 and the modular strut 16 are free to expand and contract in a telescoping action relative to one another in a longitudinal direction represented by arrow X1 (shown in FIG. 8), with a resultant increase or decrease of the distance X, thereby allowing for protection of the modular cage 50 from damage resulting from water hammer, and preservation of the integrity of the gaskets 92, 96 under the effects of water hammer, thermal expansion and contraction, pressure fluctuations, and part length variations.

Figure 13:
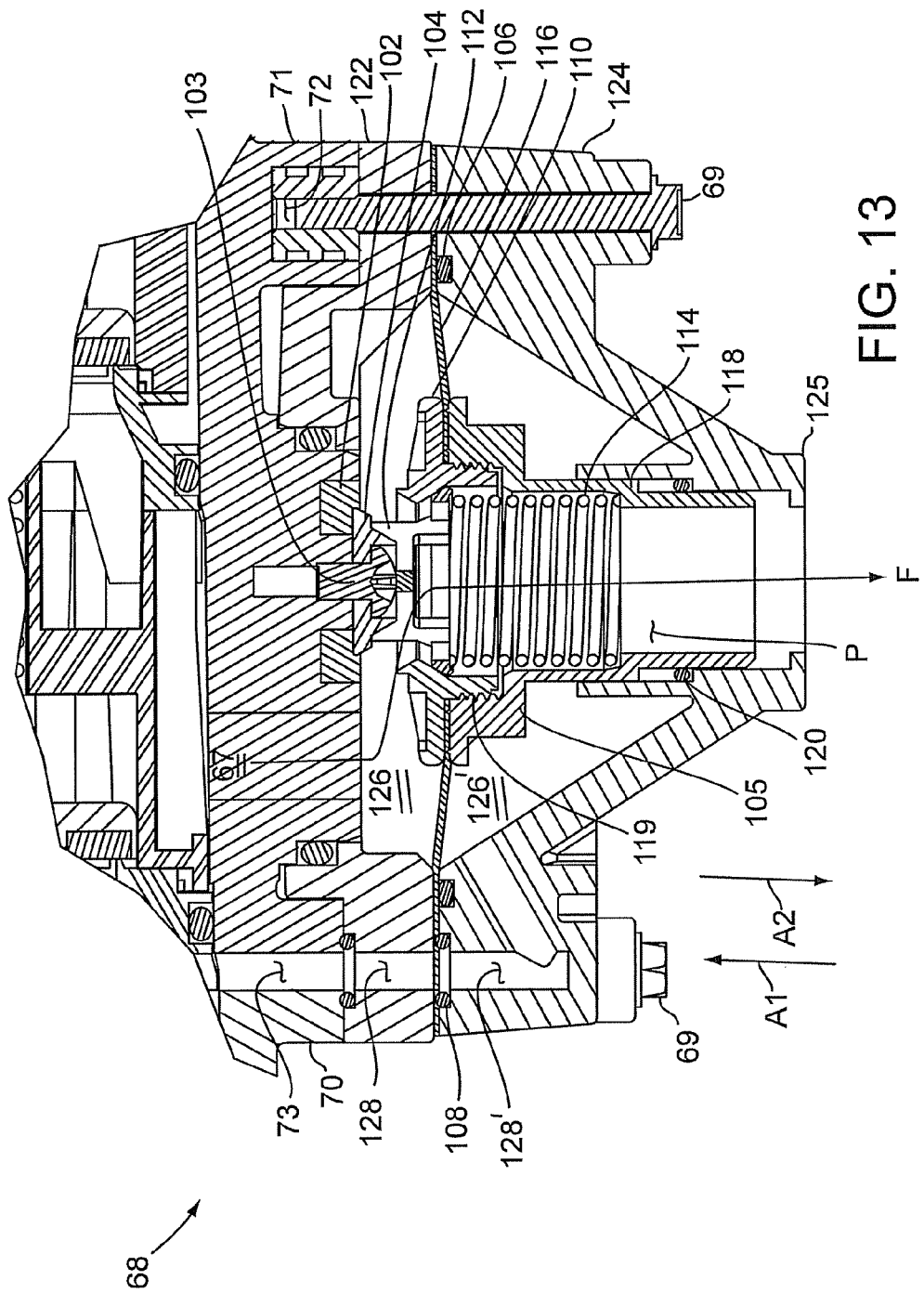
FIG. 13 is a sectional, elevated side view of the pressure relief valve of the check valve assembly shown in FIG. 8.
Figure 16:
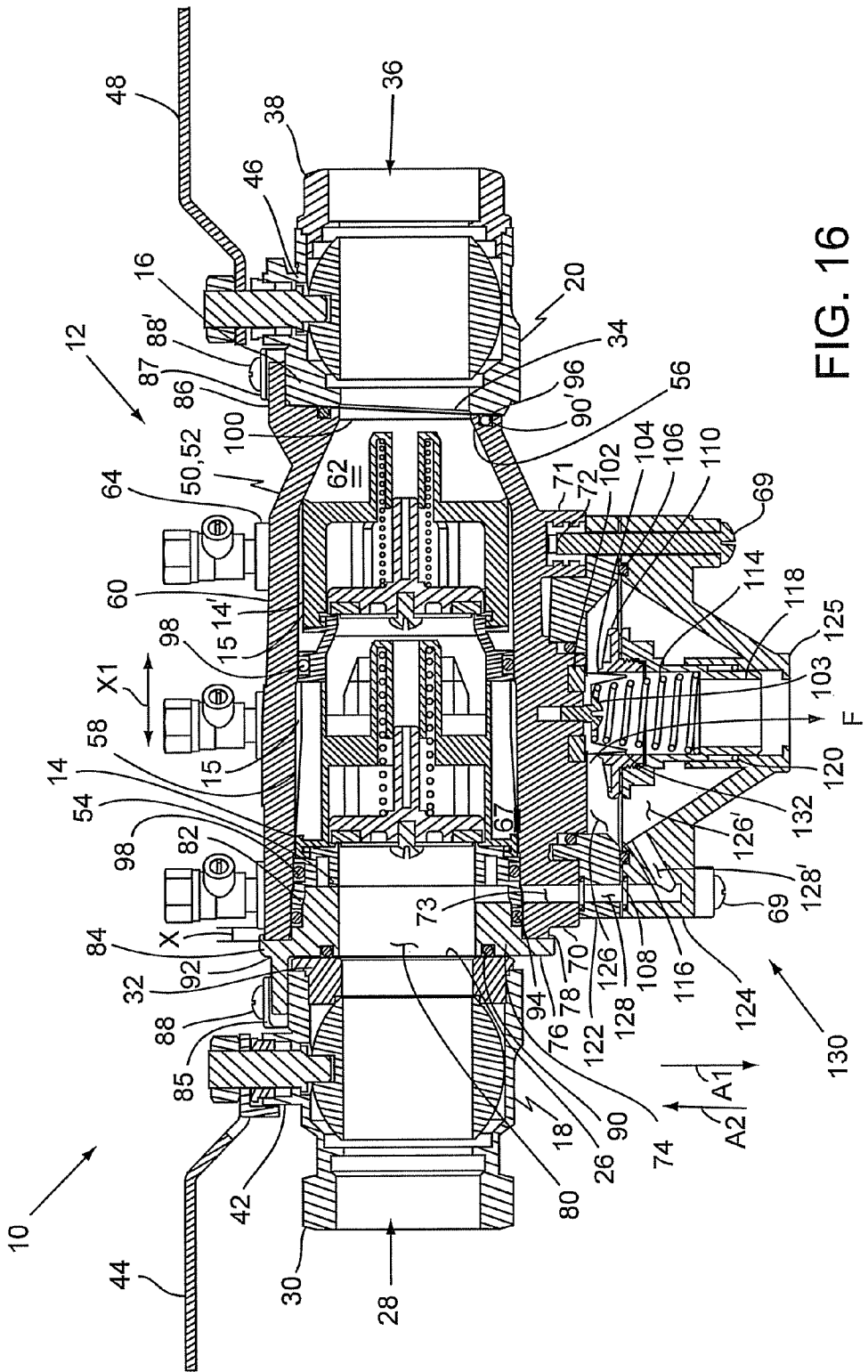
FIG. 16 is a view similar to the view of FIG. 8 showing another non-limiting embodiment of a pressure relief valve of the check valve assembly shown in FIG. 1.

Referring to FIGS. 8 and 13-15 as needed, the pressure relief valve 68 includes a rubber seal 102, a seal retainer 104, a fastener 103, such as a screw, a relief valve cartridge 105 defining a central passageway P, a main seal 106, and a port seal 108. The seal retainer 104 secures the rubber seal 102 to the valve tap 66 of the body 52 of the modular cage 50 via the screw 103 as shown in FIG. 13. The rubber seal 102 remains stationary during operation of the relief valve 68. Referring to FIGS. 13-15, and particularly to FIG. 15, the cartridge 105 includes a valve seat 110, a spring guide 112, a spring 114, a diaphragm 116, a valve piston 118, and a piston seal 120. The spring 114, spring guide 112, and diaphragm 116 are positioned between the piston 118 and the valve seat 110, wherein the spring 114 and spring guide 112 are defined within the passageway P, and the piston seal 120 is positioned around the piston 118 (see FIG. 13). The piston 118 and spring guide 112 are biased by spring 114, wherein the spring guide 112 abuts against the seal retainer 104. The cartridge 105 is held together by threads 119 on an underside of the valve seat 110, which co-acts with corresponding threads 121 in the piston 118 (clearly shown in FIG. 13). Alternatively, the cartridge 105 can be held together by a plurality of fasteners or by some other means of permanent adhesion of the valve seat 110 to the piston 118. The spring guide 112 serves the purpose of trapping the spring 114 inside of the cartridge 105, as well as providing a stanchion for transmitting the spring force between the piston 118 and the seal retainer 104 to bias the valve seat 110 away from the valve tap 66 into an open position. Also, the spring guide 112 provides for a fluid flow path F (shown in FIGS. 8 and 13) that does not cross the spring 114. Alternatively, the spring guide 112 can be eliminated and the spring 114 can press directly on the seal retainer 104. In this case, the flow path F would cross over the spring 114 as shown in FIG. 16.

Referring to FIGS. 8-13, the relief valve 68 also includes a first valve body 122 and a second valve body 124 defining an outlet 125, wherein each body 122, 124 defines an interior cavity 126, 126' and a pressure port 128, 128', respectively, partitioned by the diaphragm 116 and containing the relief valve cartridge 105. Alternatively, the rubber seal 102 (see FIG. 13) can also be secured within the interior cavity 126 of the first valve body 122, apart from the body 52 of the modular cage 50. The first valve body 122 is attached to the second valve body 124, wherein the main seal 106 and the port seal 108 (see FIG. 13) are positioned therebetween. The attachment of the first valve body 122 to the second valve body 124 can be done by a mechanical arrangement, such as with the use of a nut and bolt arrangement. The relief valve 68 can be attached to the valve tap 66 by a plurality of fasteners, such as bolts 69, passing though holes 123 (shown in FIGS. 12 and 14) defined in the valve bodies 122, 124 and received with the slots 72 defined in the protrusions 70, 71 of the body 52 of the modular cage 50 (see FIGS. 7 and 13).

When the relief valve 68 is in a normally closed position, the valve seat 110 abuts against the rubber seal 102 (partially shown in phantom in FIG. 8 and designated by P), thus closing off the flow path F. In the closed position, the interior cavity 126' of the second valve body 124 below the diaphragm 116 is filled with fluid via the pressure ports 73, 128 and 128', whereby the pressure in the interior cavity 126' (i.e., high side), e.g., the fluid pressure, is greater than the pressure in the interior cavity 126 (i.e., low side). This causes the diaphragm 116 to flex in the direction of arrow A1 (see FIGS. 8 and 13), which raises the valve seat 110 and piston 118, thus compressing the spring 114, thereby sealing the valve seat 110 against the rubber seal 102.

When the relief valve 68 is in an open position (shown in FIGS. 8 and 13), the valve seat 110 is spaced from the rubber seal 102, thereby allowing fluid to flow through the flow path F defined by the valve seat 110, diaphragm 116, spring 114, piston 118, and outlet 125 of the second valve body 124. This open position occurs when the force on the low side of interior cavity 126, due to pressure acting in conjunction with the spring, is greater than the force on the high side of interior cavity 126'. This causes the diaphragm 116 to flex in the direction of arrow A2, which lowers the valve seat 110 and piston 118, thus expanding the spring 114, thereby breaking the seal between the valve seat 110 and the rubber seal 102.

The relief valve 68 provides for a strong/positive relief valve operation while maintaining relatively compact overall dimensions. The design of relief valve 68 also provides for easy inspection, repair, and replacement of the rubber seal 102 and for easy inspection and replacement of the relief valve cartridge 105 by removing the cartridge 105 from the valve bodies 122, 124.

Figure 17:
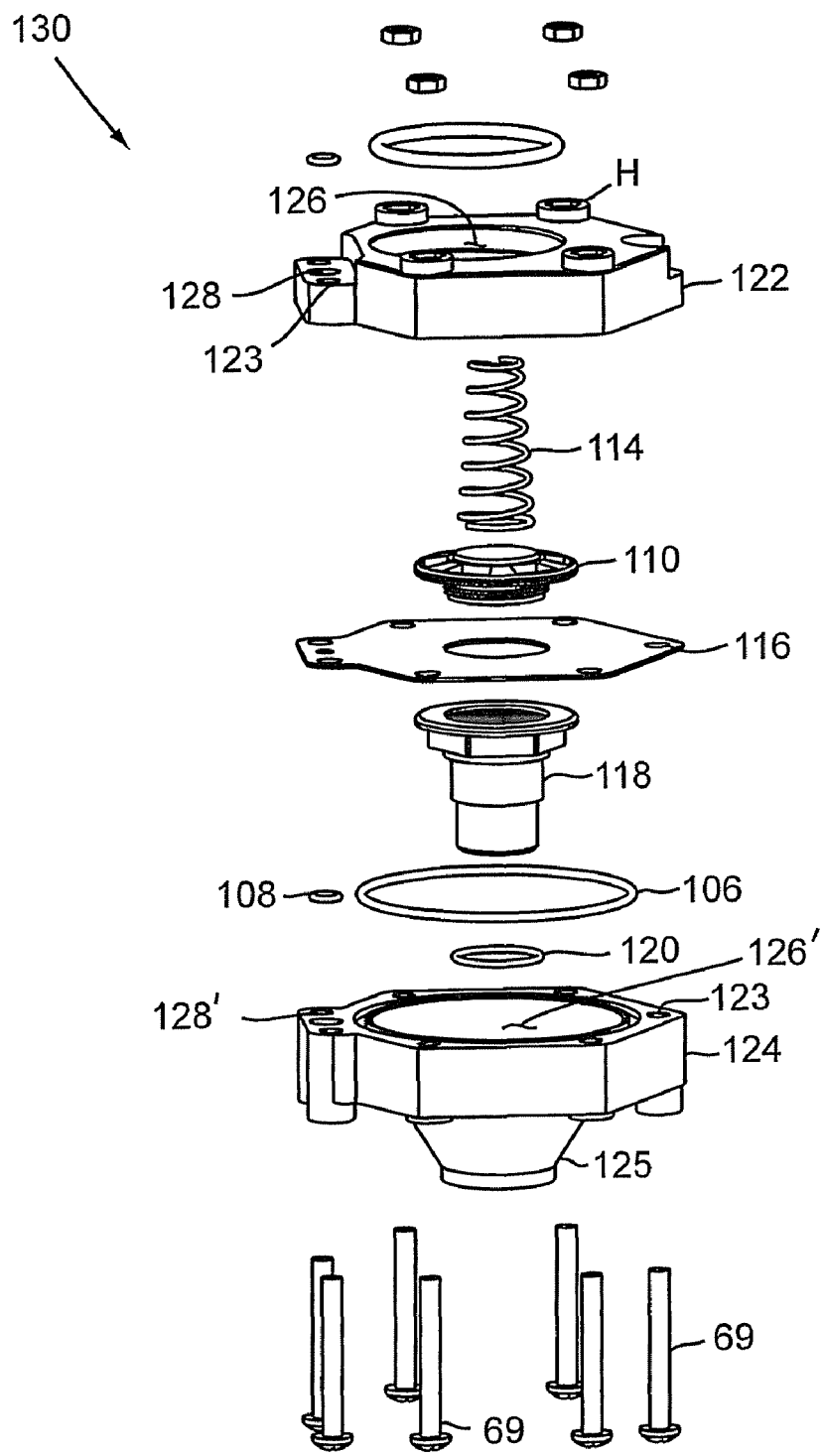
FIG. 17 is an exploded view of the pressure relief valve shown in FIG. 16.

FIGS. 16 and 17 show another non-limiting embodiment of a relief valve of the invention, designated by the number 130, that is similar to relief valve 68 with differences noted below. Like reference numerals will be used for like parts. Relief valve 130 does not include a spring guide 112, as in relief valve 68. The spring 114 in relief valve 130 abuts directly against the seal retainer 104. The seal retainer 104, which secures the rubber seal 102 to the body 52 of the modular cage 50, includes four prongs 132 (only two are shown in FIG. 16) extending from a surface of the seal retainer 104. The prongs 132 function as a guide for the valve seat 110. Relief valve 130 also operates similar to relief valve 68, except that the flow path F of the relief valve 130 crosses over the spring 114 when in an open position.

Figure 9:
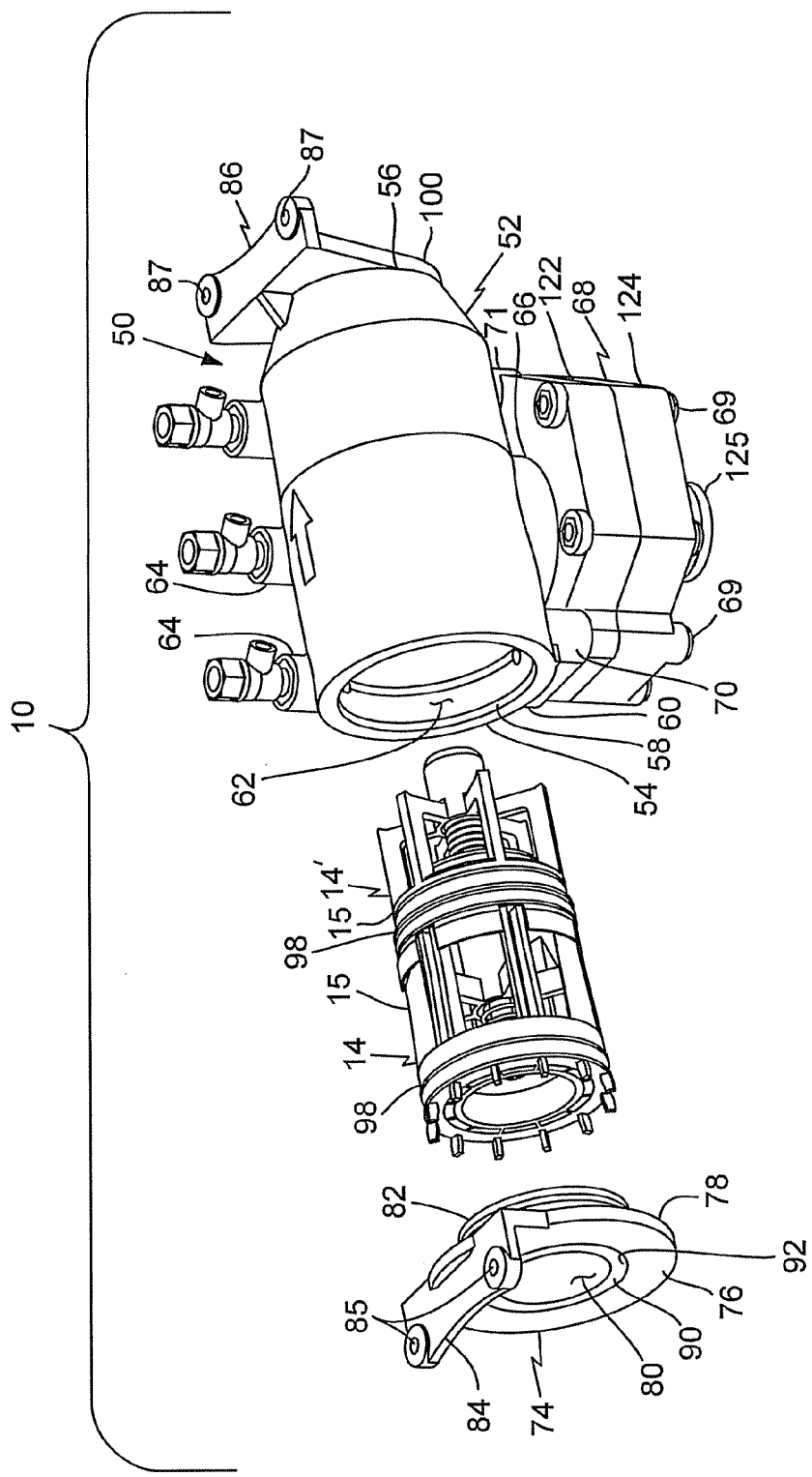
FIG. 9 is an exploded view of the modular fluid arrangement of the check valve assembly shown in FIG. 2 showing two check valves removably attached to each other.
Figure 10:
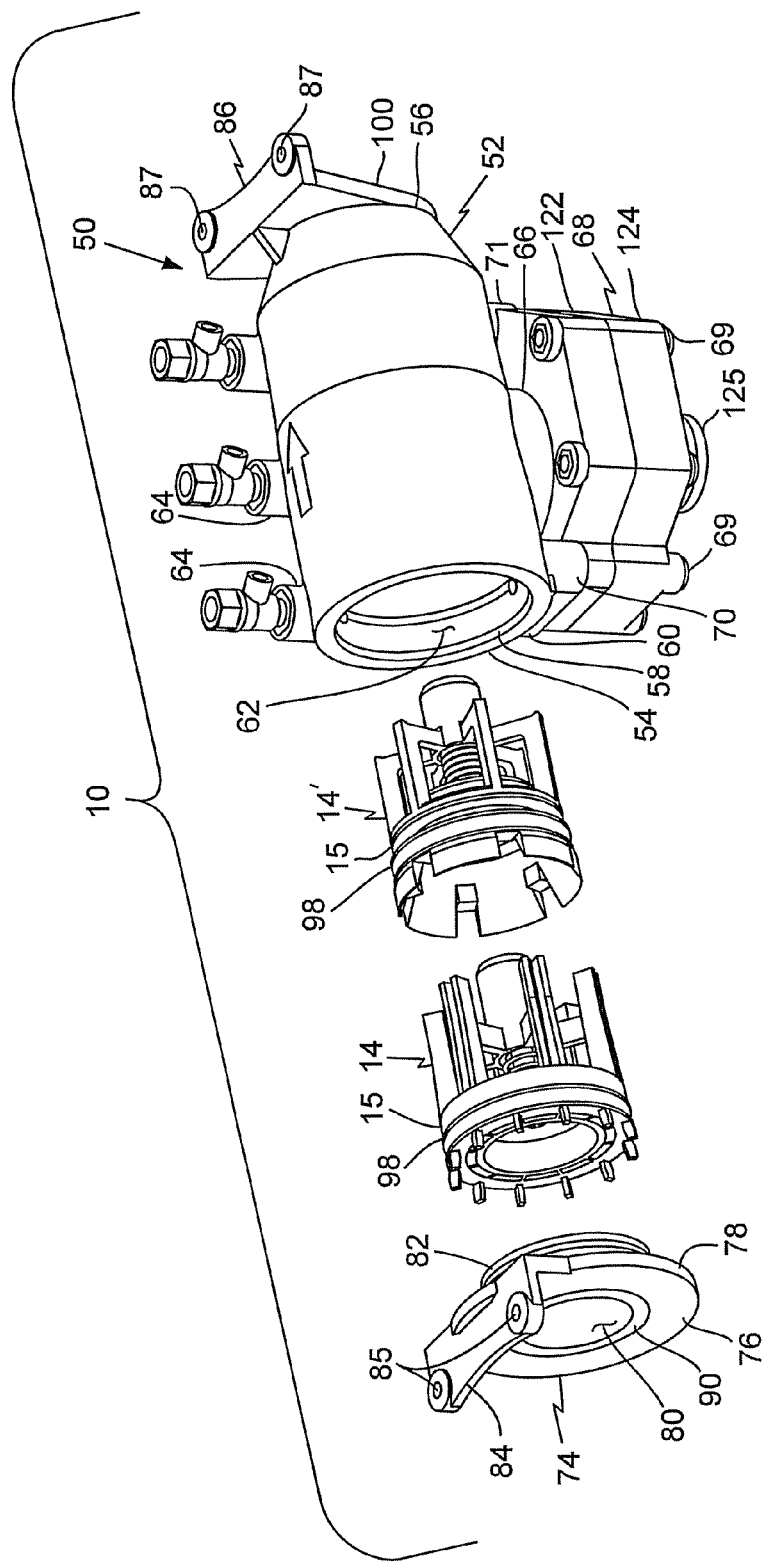
FIG. 10 is a view similar to the view of FIG. 9 showing the check valves detached from each another.
Figure 11:
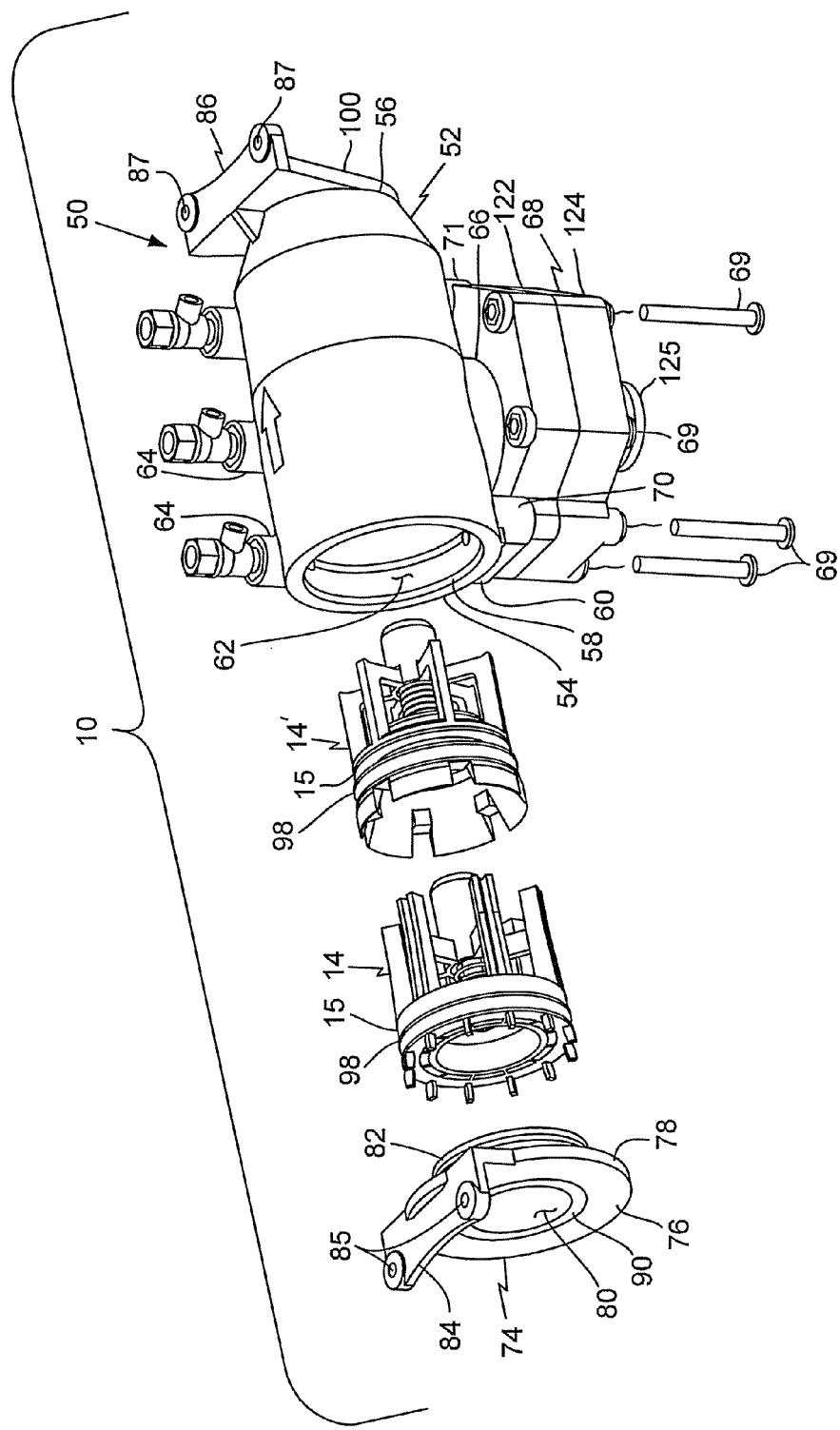
FIG. 11 is a view similar to the view of FIG. 9 showing fasteners removed from the modular fluid arrangement.
Figure 12:
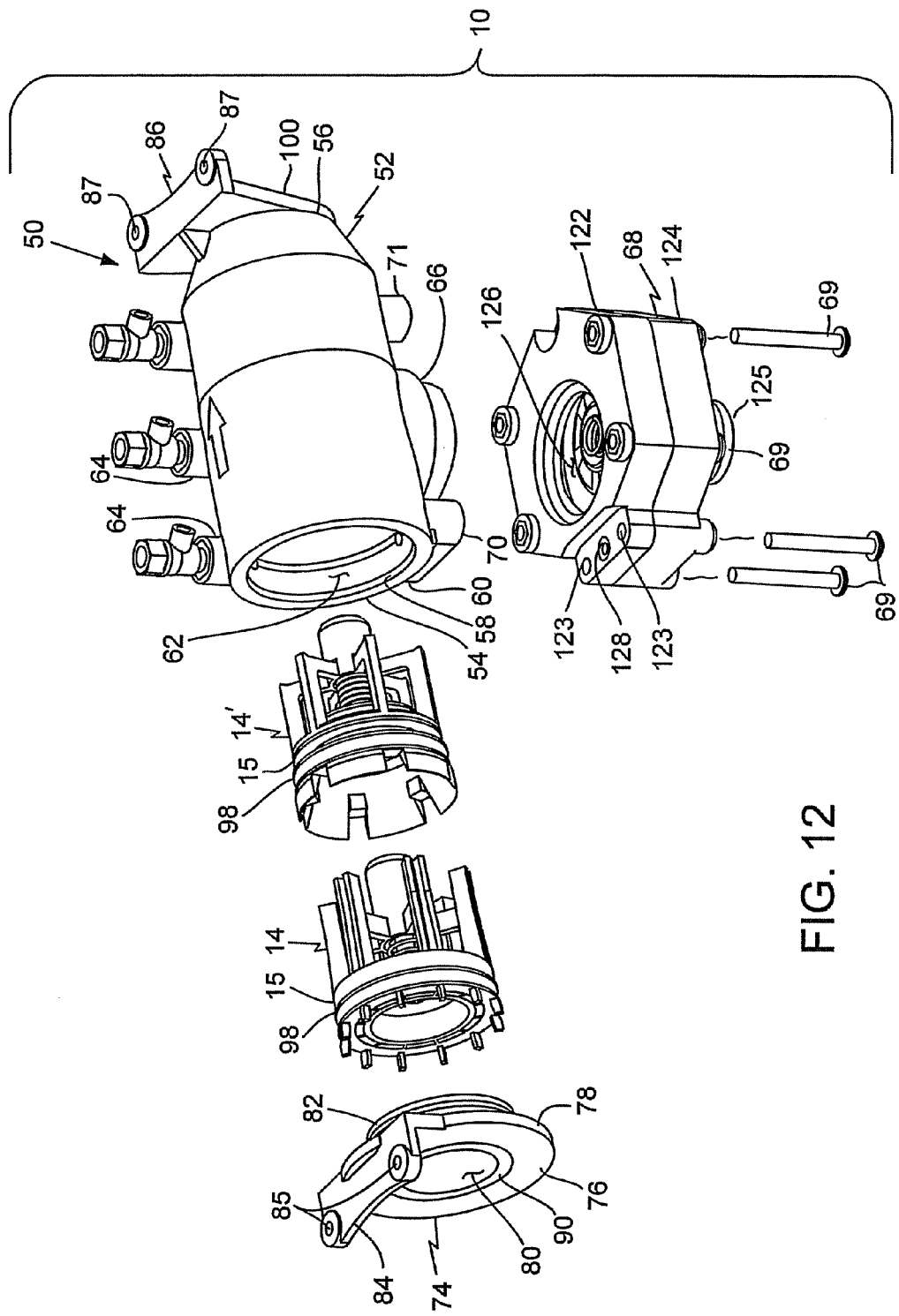
FIG. 12 is a view similar to the view of FIG. 9 showing a pressure relief valve detached from the modular fluid arrangement.

The present invention also provides for a method of installing check valves 14, 14' in line with respect to a fluid conduit using the modular fluid arrangement 12 of the present invention. Referring to FIGS. 9-11, check valves 14, 14' having valve gasket 98 positioned on the outer surfaces 15 of each check valve 14, 14' are inserted into the interior cavity 62 of the body 52 of the modular cage 50 via the first open end 54. A second gasket 94 is placed on annular member 82 of end piece 74, and the end piece 74 is inserted through the first open end 54 of the interior cavity 62 of the body 52 of the modular cage 50. Gaskets 92 and 96 are placed adjacent the first side 76 of the end piece 74 and the second open end 56 of the modular cage 50, respectively. Next, the modular cage 50 is inserted into the modular cage receiving area 22 of the modular strut 16, wherein the wedge surface 100 of the body 52 is positioned adjacent the outlet receiving surface 34 of the outlet body 20 of the modular strut 16. The modular cage 50 and the modular strut 16 are secured to each other via the fasteners 88, 88' passing through slots 85, 87 of brackets 84, 86, respectively, and receiving slots 21 in the inlet body 18 and the outlet body 20 of the modular strut 16. Finally, the modular fluid arrangement 12 is installed in line with respect to a fluid conduit (not shown) at the inlet body 18 and the outlet body 20 of the modular strut 16. The fluid conduit, such as a pipe, can be threaded, welded, flanged, or bolted onto the first connector 30 of the inlet body 18 and the second connector 38 of the outlet body 20 of the modular strut 16.

In operation, the check valves 14, 14' in the modular fluid arrangement 12 open when fluid flows from the inlet body 18 of the modular strut 16 through check valves 14, 14' in the interior cavity 62 of the modular cage 50, exiting through the outlet body 20 of the modular strut 16 as indicated by arrow F1 shown in FIG. 1. Should fluid flow in an opposite direction as indicated by arrow F2, the check valves 14, 14' close, thereby preventing the flow of fluid through the modular fluid arrangement 12. Should the fluid pressure in the interior cavity 62 of the body 52 of the modular cage 50 become greater than the upstream pressure at pressure port 73, the relief valve 68 opens as discussed above to open up a flow path F for fluid to escape into the atmosphere or the environment.

Periodically, the check valves 14, 14' of the check valve assembly 10 must be inspected. This can be done by shutting down the fluid flow using shutoff valves 42 and 46 and loosening the fasteners 88, 88', thereby removing the modular cage 50 from the modular cage receiving area 22 of the modular strut 16. Each of the check valves 14, 14' can be removed from the interior cavity 62 of the modular cage 50 and inspected, repaired, and/or replaced, while the modular strut 16 remains in line with respect to the fluid handling installation. The check valve assembly 10 provides for easy accessibility for repair, inspection, or replacement of check valves 14, 14', thus minimizing downtime in a fluid handling installation.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention, which is to be given the full breadth of the appended claims and any and all equivalents thereof.

The invention claimed is:

1. A modular fluid arrangement comprising:
a modular strut having an inlet body and an outlet body and defining a modular cage receiving area therebetween;
a modular cage removably secured to said modular strut and received by the modular cage receiving area, said modular cage having a first open end and a second open end and defining an interior cavity, said modular cage further comprising an end piece defining a central opening and having an annular member extending therefrom, said end piece positioned adjacent said first open end of said modular cage such that said annular member is received within the interior cavity, wherein the interior cavity of said modular cage is in fluid communication with said inlet body and said outlet body of said modular strut; and
a first sealing gasket, a second sealing gasket and a third sealing gasket for fluidly sealing said modular cage within the modular cage receiving area, a first axis passing through the interior cavity said first sealing gasket positioned between an inlet surface of said inlet body and said end piece, wherein said first sealing gasket is positioned about the first axis, wherein a plane is defined at the adjacent abutting surface of the inlet surface and the end piece through which the first axis passes, said second sealing gasket positioned around said annular member of said end piece for fluidly sealing said annular member within the interior cavity of said modular cage such that said second sealing gasket seals about a cylindrical surface circumferentially about the first axis, and said third sealing gasket positioned between an outlet surface of said outlet body and said second open end of said modular cage and about the first axis, wherein a plane is defined at the abutting surfaces of the said outlet surface and said second open end through which the first axis passes, wherein:
said modular cage and said modular strut are free to expand and contract a predetermined distance in a telescoping action relative to one another in a longitudinal direction thereby maintaining a fluid seal therebetween, and
the interior cavity of said modular cage is adapted to receive at least one check valve.

2. The modular fluid arrangement of claim 1, further comprising at least one check valve in the interior cavity of the modular cage.

3. The modular fluid arrangement of claim 1, wherein the modular cage and the modular cage receiving area are sized relative to one another, such that the modular cage and the modular strut can move relative to one another in a longitudinal direction.

4. The modular fluid arrangement of claim 1, wherein an outer surface portion of the modular cage has a wedge surface adjacent at least one of the first and second open ends to seat the modular cage in the modular cage receiving area of the modular strut.

5. The modular fluid arrangement of claim 1, further comprising a pressure relief valve securely mounted to the exterior of the modular cage, the pressure relief valve having a valve arrangement having a first position and a second position, wherein in the first position, the valve arrangement provides fluid communication between the interior of the modular cage and exterior of the modular cage, and in the second position prevents fluid communication between the interior of the modular cage and exterior of the modular cage.

6. The modular fluid arrangement of claim 5, wherein the pressure relief valve comprises a first interior chamber and a second interior chamber separated by a diaphragm and a passageway extending from the first chamber of the pressure relief valve to exterior of the pressure relief valve and the exterior of the modular cage, wherein with the valve arrangement in the first position, fluid communication is provided between the first chamber of the pressure relief valve and the passageway, and the modular cage further comprising a valve tap providing fluid communication between the interior of the modular cage and the first chamber of the pressure relief valve.

7. The modular fluid arrangement of claim 6, further comprising at least one check valve in the interior cavity of the modular cage.

8. The modular fluid arrangement of claim 6, wherein the modular cage further comprises a first port in fluid communication with the interior of the modular cage and the second interior chamber of the pressure relief valve.

9. The modular fluid arrangement of claim 6, wherein the valve arrangement comprises the diaphragm having a first surface facing the first chamber and an opposite second surface facing the second chamber, with a hole interconnecting the first and second surfaces, a piston having a closed end and an open end, with the open end facing the second surface of the diaphragm, a spring in the piston housing, a valve guide having at least one prong mounted in the piston against the biasing action of the spring, and a valve seat having at least one hole secured in the open end of the piston to capture the diaphragm between the piston and the valve seat, with the at least one prong of the valve guide extending through the at least one hole of valve seat, and wherein with the valve arrangement in the first position, the diaphragm is biased away from the modular cage and distance between the valve seat and the exterior of the modular cage increases to provide fluid communication between the first chamber and the passageway, and, with the valve arrangement in the second position biasing action on the diaphragm is removed.

10. The modular fluid arrangement of claim 9, wherein with the valve arrangement in the first position, a fluid passageway is provided from the interior of the modular cage, through the valve tap, into the first chamber, through the valve seat and valve guide, through the spring, and out of the pressure relief valve through the passageway.

11. The modular fluid arrangement of claim 10, wherein the valve tap further comprises a seal mounted in a groove provided in the outer surface of the modular cage and a seal retainer to secure the seal in position, wherein with the valve arrangement in the second position, a spring guide engages a portion of the seal.

12. The modular fluid arrangement of claim 6, wherein the valve arrangement comprises the diaphragm having a first surface facing the first chamber and an opposite second surface facing the second chamber, with a hole interconnecting the first and second surfaces, a piston having a closed end and an open end, with the open end facing the second surface of the diaphragm, a spring in the piston housing, and a valve seat having at least one hole secured in the open end of the piston to capture the diaphragm between the piston and the valve seat, and wherein with the valve arrangement in the first position, the diaphragm is biased away from the modular cage and distance between the valve seat and the exterior of the modular cage increases to provide fluid communication between the first chamber and the passageway, and with the valve arrangement in the second position, biasing action on the diaphragm is removed.

13. The modular fluid arrangement of claim 12, wherein with the valve arrangement in the first position, a fluid passageway is provided from the interior of the modular cage, through the valve tap, into the first chamber, through the valve seat, over the spring, and out of the pressure relief valve through the passageway.

14. The modular fluid arrangement of claim 13, wherein the valve tap further comprises a seal mounted in a groove provided in the outer surface of the modular cage and a seal retainer to secure the seal in position, the seal retainer having at least one prong extending away from the modular cage, and the valve seat having at least one hole, and wherein with the valve arrangement in the second position, a spring guide passes over the retainer and engages a portion of the seal.

15. The modular fluid arrangement of claim 1, wherein the modular cage further comprises at least one tap extending from the modular cage and in fluid communication with the interior of the modular cage.

\* \* \* \* \*